United States Patent [19]

Reiner et al.

[11] 4,112,498
[45] Sep. 5, 1978

[54] DIGITAL CORRELATION RECEIVER

[75] Inventors: Udo Reiner, Munich; Gerhard Hinrichsen, Geretsried, both of Fed. Rep. of Germany

[73] Assignee: Siemens Aktiengesellschaft, Berlin & Munich, Fed. Rep. of Germany

[21] Appl. No.: 765,401

[22] Filed: Feb. 3, 1977

[30] Foreign Application Priority Data

Feb. 24, 1976 [DE] Fed. Rep. of Germany ....... 2607433

[51] Int. Cl.$^2$ .......................... G06F 15/34; H04B 7/19
[52] U.S. Cl. .................... 364/728; 178/69.1; 179/15 BS; 340/146.2; 364/769
[58] Field of Search .............. 340/146.2; 178/69.1; 179/15 BS; 364/514, 728, 768, 769, 784

[56] References Cited

U.S. PATENT DOCUMENTS

| 3,346,844 | 10/1967 | Scott et al. | 340/146.2 |
| 3,363,233 | 1/1968 | Petzold | 340/146.2 |
| 3,656,109 | 4/1972 | Conway | 340/146.2 |
| 3,760,355 | 9/1973 | Bruckert | 340/146.2 |
| 3,796,868 | 3/1974 | Kaul et al. | 235/181 |
| 3,947,673 | 3/1976 | Jordan et al. | 235/181 |
| 4,006,302 | 2/1977 | Reisinger | 179/15 BS |
| 4,010,420 | 3/1977 | Reiner et al. | 178/69.1 |

Primary Examiner—Felix D. Gruber
Attorney, Agent, or Firm—Hill, Gross, Simpson, Van Santen, Steadman, Chiara & Simpson

[57] ABSTRACT

A digital correlation receiver, particularly for satellite communications transmission, wherein the signal channels or bursts, from various ground stations, combined in a time division multiplex (t.d.m.) arrangement and provided with a preamble comprising a synchronizing word, are time-staggered at the satellite end, and, relative to the reference burst which marks the beginning of the frame, are combined to form a frame and retransmitted with time division multiplex access (TDMA); in which a shift register receives the incoming bit flow at the receiving end and comparators are connected to the individual cells of the shift register, and at whose second comparator inputs a logic state exists representing the synchronizing word to which the received word should correspond, the output of the respective comparators being supplied, in respective combinations, to successive groups of adder stages which are interconnected over corresponding stores, with the respective addition results being supplied to an analysis circuit from which the correlation peak is derived.

4 Claims, 1 Drawing Figure

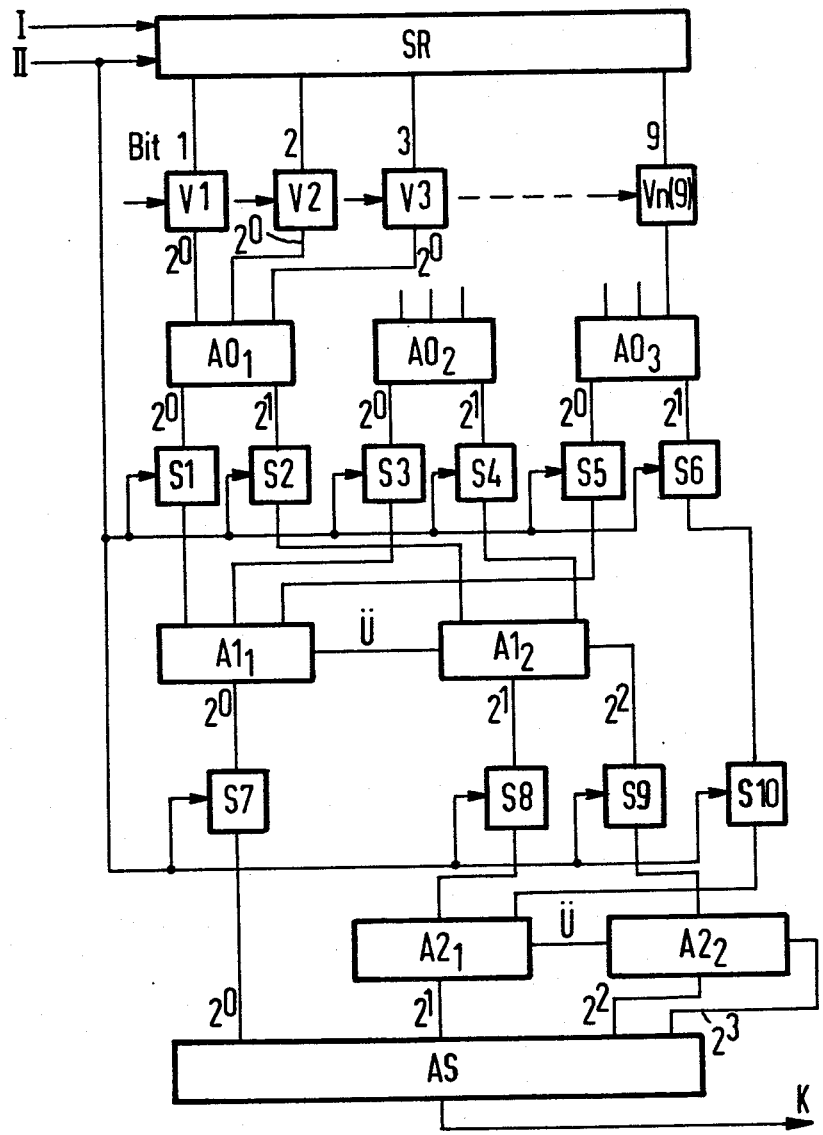

DIGITAL CORRELATION RECEIVER

BACKGROUND OF THE INVENTION

The invention relates to a digital correlation receiver, particularly for satellite communications transmission, in which the signal channels or bursts from various ground stations, combined in a time division multiplex (t.d.m.) arrangement and provided with a preamble comprising a synchronizing word, are time staggered at the satellite end, and, relative to the reference burst which marks the beginning of the frame, are combined to form a frame and retransmitted (TDMA).

It is necessary in digital transmission operations to synchronize the receiver to the transmitter, and in point-to-point transmission links this is a relatively simple matter as, in the case of existing synchronism, it is merely necessary to monitor the synchronism, and the redundancy. Consequently, the safeguard may comprise a periodic repetition of the synchronizing word. The problem of synchronization is more difficult in transmissions employing burst operation in which the synchronism must be rederived at the beginning of each burst. The difficulty further increases when the received bursts are not pulse-coherent to one another.

Consequently, steps must be taken to insure that the beginning of the burst, and thus the synchronism of each individual burst, can be ascertained with sufficiently high reliability. While this could be accomplished by a redundant transmission of the synchronizing word or a synchronizing word with fault correction, such a solution has the disadvantage that a greater or lesser number of additional bits is required which thus correspondingly reduces the useful component of the burst, and thus results in a reduction in an economy of the TDMA method.

In the publication "Unique Word Detection in Digital Burst Communications" by W. Schrempp and T. Sekimoto, which appeared in IEEE Transactions on Communication Technology, Vol. 16 Com-16, No. 4, August 1968, synchronizing words of this type are provided for the TDMA transmission method. The synchronizing words are recognized in a receiver by means of a correlation circuit and then a burst-commence-characteristic is derived in such receiver.

BRIEF SUMMARY OF THE INVENTION

The invention therefore has as a primary objective to provide a receiver by means of which a reliable signal is derived from a synchronizing word, employing correlation reception, which signal marks the burst beginning, whereby such beginning can still be recognized with great reliability in the presence of interferences on the transmission link and thus give rise to bit adulterations.

This objective is achieved with a digital correlation receiver of the type heretofore mentioned, by the utilization of a shift register with comparator components being connected to the respective cells of the shift register, to which is supplied the bit flow incoming at the receiving end. The second inputs of the respective comparator components having a logic state existing thereat which represents the synchronizing word to which the contents of the shift register, following complete input thereinto of the received word, should be in correspondence. The outputs of the individual comparator components are connected to a first group of adder stages whose paired outputs having the values $2^0$ and $2^1$ are each connected to a storage element, and the latter in turn connected to further groups of adder stages and associated storage elements for the storage of the intermediate results, with the last group of adder stages being followed by an analysis device from which the correlation signal is derived.

By means of the measures employed in the invention, namely the establishment of the correlation signal by digital addition and intermediate storage of the results of the individual addition stages, a simple circuit arrangement involving a low circuity outlay can be achieved, while at the same time increasing the transmitted bit rate. Due to the intermediate storage of the results of the addition stages, such results are available for the following addition during a complete pulse train period. Advantageously, the shift register and the individual storage components are operated from a common pulse train stage.

BRIEF DESCRIPTION OF THE DRAWING

In the drawing, the FIGURE illustrates, in block form, a schematic circuit diagram of a correlation receiver in which the correlation signal is derived by digital addition.

DETAILED DESCRIPTION OF THE INVENTION

Referring to the drawing, the reference letters SR designate a shift register, while the letters V, A and S, respectively designate the comparator components, adders and stores which are identified by corresponding numbers and indices. The shift register SR is provided with two inputs I and II, with the bit flow being supplied over the input I and the pulse train being supplied over the second input II. The pulse train of input II is simultaneously supplied to individual stores S1–S10, whereby the shift register and the individual stores are operated by the same pulse train.

The outputs of the individual cells of the shift register SR are supplied to the respective comparator components V1–V2,V3 . . . V$n$. (The examplary embodiment of the invention illustrated employing a 9-digit synchronizing word, whereby $n=9$). The comparator components are supplied at their second input with a logic state corresponding to the digits of the synchronizing word whereby, upon complete entry of the received synchronizing word into the register, identity of comparison should exist in each comparator component and, in the event of such identity, the respective comparator circuits emit a different logic state to that which would be emitted in the event of non-identity. Thus identity would be present at all outputs only when the corresponding synchronizing word has been written in the register.

The identity states at the respective outputs are then added up in purely digital form, with initially the individual outputs of the comparators V1–V9 being combined in groups of three, and added in adders $AO_1$, $AO_2$ and $AO_3$, wherein two of the inputs are formed by the addition inputs and the third is formed by the carry input of the addition module. The outputs of the adders $AO_1$, $AO_2$ and $AO_3$ of such first adder stage or group have the values $2^0$ and $2^1$, with output $2^1$ representing the carry output. Following the adders $AO_1$–$AO_3$ of the first adder stage are respective stores S1–S6, with the outputs of the adder $AO_1$ having the values $2^0$ and $2^1$ being connected to the stores S1 and S2, while the outputs of the adder $AO_2$ having the values $2^0$ and $2^1$ are connected to the stores S3 and S4, and in like manner the outputs of the adder $AO_3$ having the values $2^0$ and $2^1$ are connected to the stores S5 and S6. Such stores, as well as the stores following subsequent adder stages, are operative to store the intermediate results of the individual adder stages and as a result, the upper limit of the transmission bit rate is formed in accordance with the transit time which is governed by one or at the maximum two circuits.

The stores S1–S6 are followed by a further adder stage comprising adders $A1_1$ and $A1_2$, in which the results of the first adder stage are further added up. Thus, the outputs of the stores S1, S3 and S5 are connected to the adder $A1_1$ and the stores S2 and S4 are connected to the adder $A1_2$ as is the carry output Ü of the adder $A1_1$. The store S6 is directly connected to the store S10 which belongs with a group of stores S7–S10 following the second adder stage comprising adders $A1_1$ and $A1_2$.

The output of adder $A1_1$, having the value $2^0$, is connected to the store S7 while the outputs of the adder $A1_2$, having the values $2^1$ and $2^2$, are connected to the stores S8 and S9. The output of the store S7, having the value $2^0$, is directly connected to the analysis circuit AS. Stores S8–S10 are followed by a third adder stage comprising adders $A2_1$ and $A2_2$ with the stores S8 and S10 being connected to the adder $A2_1$, while the store S9 is connected to the adder $A2_2$, as is the carry output Ü of the adder $A2_1$. The output of the adder having the value $2^1$ and the outputs of the adder $A2_2$ having the values $2^2$ and $2^3$ are also supplied to the analysis circuit AS, from the output of which the correlation signal or peak K is obtained. The analysis circuit AS may be of any suitable construction, operative to provide the correlation peak in the presence of the correct input signals, i.e. the input signals from the store S7 and adders $A2_1$ and $A2_2$.

An arrangement in accordance with the invention is particularly economical in the utilization of circuits as only one adding system and one analysis circuit is required, and it thus is possible to eliminate expensive parallel or even multiple operation requiring a high equipment and cost outlay, which would otherwise be necessary if the results were not immediately stored. As the correlation is, in fact, effected by adding the identities of a plurality of equi-valent signals, the input signal cannot be changed until the addition has been effected with certainty over all of the stages involved. To avoid the limitation of the transmittable bit rate as a result thereof, it might initially be expected that it would be necessary to proceed to the more expensive parallel or even multiple operation. However, this problem is solved in an exceedingly simple manner with the arrangement of the invention. While, as a result of the intermediate storage of the results, the correlation peak no longer is coherent with the arrival of the synchronizing word, as such delay time falls within the pulse train pattern and is dependent only upon the number of intermediate storage operations, the information can be obtained without a high outlay from the corresponding point of the shift register and thus without any additional outlay with respect to circuitry.

Having thus described our invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. In a digital correlation receiver, in particular for satellite communications transmission, in which the signal bursts, which are combined in a time division multiplex arrangement and provided with a preamble comprising a synchronizing word, from various ground stations, are time-staggered at the satellite end and, relative to the reference burst which marks the beginning of the frame, are combined to form a frame and retransmitted with time division multiple access, the combination of a shift register to which the incoming bit flow at the receiving end is supplied, comparator means to which the individual cells of the shift register are connected, and at whose second comparator inputs a logic state exists representing the synchronizing word, with which the received word in the respective shift register cells, following complete input thereof into the register, should coincide, a first group of adder stages to which is connected the respective outputs of the comparator means, a plurality of storage elements, each adder stage having a pair of outputs, respectively having the values $2^0$ and $2^1$, each of which outputs is connected to a respective storage element, at least one second group of adder stages, to which outputs of said storage elements are connected in predetermined grouping, further storage elements to which the intermediate addition results of said second group of adder stages are respectively supplied, an analysis device, means for producing a data word, said means connected between said second group of adder stages and said analysis device to provide said data word as an input to said analysis device, said analysis device in the presence of a correct data word supplying a correlation signal, and timing means for controlling such shift register and the respective storage elements.

2. The combination of claim 1, wherein said means for producing a data word includes a direct connection between one of said further storage elements and said analysis device and a third group of adder stages connected between the others of said further storage elements and said analysis device.

3. The combination according to claim 2, wherein a 9-bit synchronizing word is utilized and at least three groups of adder stages are employed, said first adder stage comprising three adders, each of which receives from the associated stores the comparison results of three cells of the shift register, the second adder stage comprising two adders, the first of which receives from the associated stores, the $2^0$ output values of each of the three adders of the first adder stage, and the second of which from the associated stores of which receives the $2^1$ output values of the first adders of the first adder stage and the carry over from the first adder of the second adder stage, and the third adder stage comprising two adders, the first of which receives from the associated stores the $2^1$ output value of the second adder of the second stage and the $2^1$ output value of the third adder of the first stage, the second adder of the third stage receiving from the associated stores the $2^2$ output value of the second adder of the second stage and the carry over from the first adder of the third stage, the $2^0$ output of the first adder of the second stage, the $2^1$ output value of the first adder of the third stage, and the $2^2$ and $2^3$ output values of the second adder of the third stage all being supplied to the analysis circuit.

4. The combination according to claim 1, wherein the shift register and the individual storage elements are driven by a common pulse train stage.

* * * * *